United States Patent [19]

Lee

[11] Patent Number: 4,779,902

[45] Date of Patent: Oct. 25, 1988

[54] PLASTIC PIPE WITH INTEGRAL END CONNECTION

[75] Inventor: Leonard E. Lee, St. Louis, Mo.

[73] Assignee: Mid-Continent Pipe & Supply Co., Inc., Fenton, Mo.

[21] Appl. No.: 69,895

[22] Filed: Jul. 6, 1987

[51] Int. Cl.[4] .......................................... F16L 47/00
[52] U.S. Cl. .................................. 285/260; 285/351; 285/423; 285/921; 285/39; 29/525; 29/237
[58] Field of Search .............. 285/260, 423, 921, 351, 285/382.2, 381; 29/525; 403/361

[56] References Cited

U.S. PATENT DOCUMENTS

| | | | |
|---|---|---|---|
| 1,867,430 | 7/1932 | Wisner | 285/260 |
| 2,366,067 | 12/1944 | Smith | 285/260 |
| 2,985,469 | 5/1961 | Bowman, Jr. | 285/260 |
| 3,047,025 | 7/1962 | Davis | 285/260 X |
| 3,217,400 | 11/1965 | Illesy et al. | 285/260 X |
| 3,666,297 | 5/1972 | Marks | 285/921 X |
| 3,784,235 | 1/1974 | Kessler et al. | 285/921 X |
| 4,030,850 | 6/1977 | Hyde | 285/921 X |
| 4,054,984 | 10/1977 | Ball et al. | 29/237 |
| 4,128,264 | 12/1978 | Oldford | 285/319 X |
| 4,298,221 | 11/1981 | McGugan | 285/921 X |
| 4,317,471 | 3/1982 | King, Sr. | 285/921 X |
| 4,392,294 | 7/1983 | Campbell | 29/525 |
| 4,561,683 | 12/1985 | Lumsden et al. | 285/382.2 X |
| 4,601,491 | 7/1986 | Bell, Jr. et al. | 285/921 X |
| 4,629,221 | 12/1986 | Lumsden et al. | 285/331 X |

FOREIGN PATENT DOCUMENTS

| | | | |
|---|---|---|---|
| 1164816 | 4/1984 | Canada . | |
| 594227 | 5/1959 | Italy | 285/260 |
| 908930 | 10/1962 | United Kingdom | 285/260 |

*Primary Examiner*—Thomas F. Callaghan
*Attorney, Agent, or Firm*—Glenn K. Robbins

[57] ABSTRACT

Polyolefin pipe having an integral end connection. The pipe is fabricated with male and female end connections in order that the pipe may be press-fitted together with the interior and exterior forming a flush uniterrupted surface. One or more radial ribs and grooves are formed on the interior of the female connection while a registering series of ribs and grooves are formed on the exterior of the male connection. The ends of the pipe are bevelled in order that the ends pressed together engage and by the slight resiliency of the polyolefin pipe construction permit the slight expansion and contraction of the ends to provide a locking interfit of the respective ribs and grooves in the two ends. The wall thicknesses of the end connection and width of the ribs and grooves are particularly dimensioned in order that the male end may be inserted to a complete lock position without premature engagement and that should failure occur, it be at the readily observable pipe wall rather than in internal rib. Sides of the ribs may also be bevelled to provide for disengagement of the pipe ends when pulled apart.

16 Claims, 2 Drawing Sheets

PLASTIC PIPE WITH INTEGRAL END CONNECTION

BACKGROUND OF THE INVENTION

With the advent of plastic pipe such as polyolefin and other plastic materials, there has existed a need for connecting lengths of pipe together to form a string of pipes. The use of such plastic pipe has ranged from an inch or so in diameter to as much as five feet.

The connecting together of such pipes has presented a problem which is of particular significance in the field where access to equipment and labor may be difficult. While fusion of the pipe ends has been done for some time, this has generally been somewhat laborious and expensive.

Various types of end connections have been devised requiring clampes and auxiliary paraphernalia.

One such device using clamping is shown in the exterior pipe connector sleeve of U.S. Pat. No. 4,310,184 in which the pipe ends are butted together and clamped by the sleeve. This device and other end clamps require extraneous parts with the protruding clamp and damage thru being accidentally struck and damaged by external forces. For example, when joined strings of pipe are pulled in a slip-lining construction job, it is particularly desirable that the exterior of the pipe be completely flush to enhance the pulling or pushing of the pipe along the ground or through a larger pipe to be repaired.

SUMMARY OF THE INVENTION

By means of the instant invention there has been provided a plastic pipe having an integral end connection which may be joined with a like plastic pipe or rigid pipe having a mating integral end connection. The adjacent pipes may be pushed together to mate the end connectors and present an uninterrupted flush interior and exterior surface.

The plastic pipe employed is desirably of a polyolefin nature such as polyethylene, polypropylene or polybutylene having a semi-rigid characteristics but also having the ability to flex or bend and expand and compress to a slight degree to acommodate the interfit of the male and female end connections of the pipe when press-fitted together. The integral end connections may be formed in the pipe when fabricated in the molding process or later such as by machining or the like.

The structure of the end connection is in the nature of one or more of rectangular internal ribs and grooves formed on the interior of the female member which interfit in locking relation with one or more of rectangular exterior ribs and grooves formed on the exterior of the male member. When the male member is forceably pushed into the female member the latter is slightly expanded or distended while the male end may be slightly compressed until the two members are mated together at which time the female member contracts to its normal state and the male member expands to its normal state to lock the two members together.

The end ribs of both male and female members are slightly bevelled or chamfered to facilitate the sliding of the male member. To further ease this movement where a series of ribs is employed the end or outer ribs of both the male and female members are wider than the corresponding end or outer grooves to prevent premature locking of the ribs and grooves before the members are fully engaged. This relationship enables the end of the male member to ride past the end of the female member until it butts against a shoulder stop of the female member to provide proper registration of the ribs and grooves for the final locking engagement.

As a further feature the width of the ribs in both the male and female members are greater than the wall thickness of the grooves. The relationship provides a "fail safe" feature which can be readily detected in the exterior wall of the ends of the pipe rather than an internal rib break which would provide a hidden defect of a dangerous nature.

In order to provide for disengagement of the end connections the sides of the ribs and grooves may be bevelled which provides a camming force to expand the female member and contract the male member when pulled apart.

The above features are objects of this invention. Further objects will appear in the detailed description which follows and will be further apparent to those skilled in the art.

For the purpose of illustration of this invention, a preferred embodiment thereof is shown in the accompanying drawing. It is to be understood that the drawing is for purpose of description only and that the invention is not limited thereto.

IN THE DRAWING

DESCRIPTION OF THE INVENTION

Figure 1:
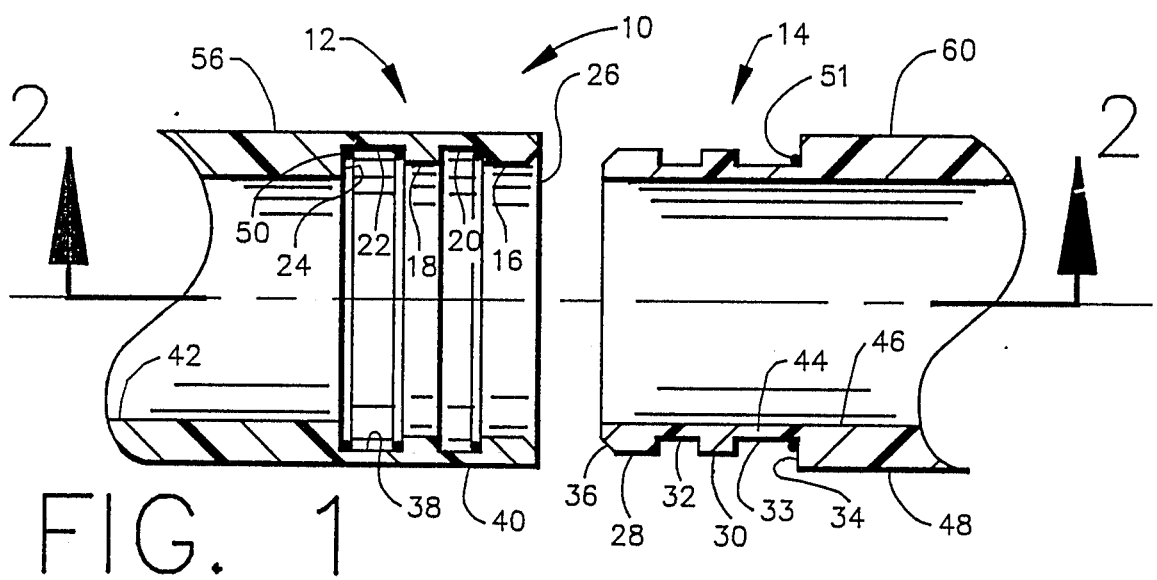
FIG. 1 is a view in axial section of the pipe having the integral end connections before being joined.
Figure 2:
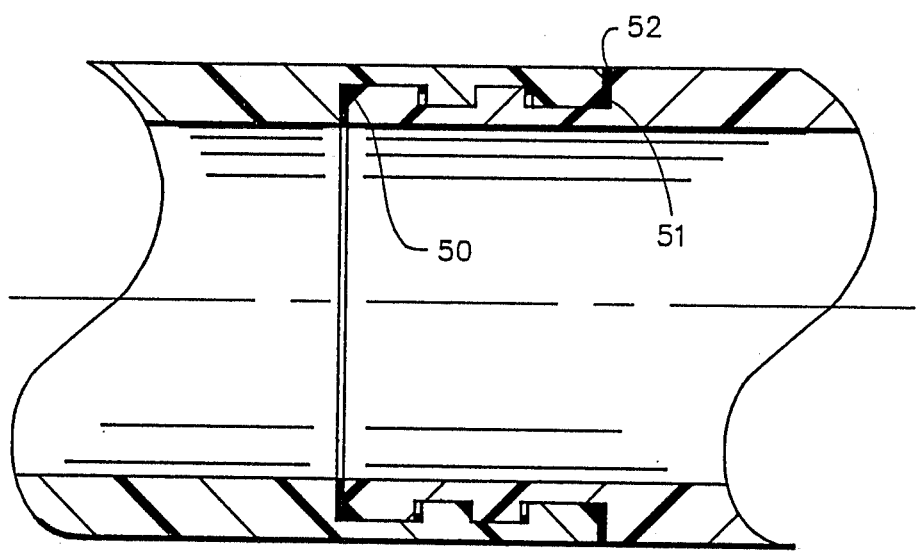
FIG. 2 is an enlarged view in axial section showing joined ends of the pipe.
Figure 3:
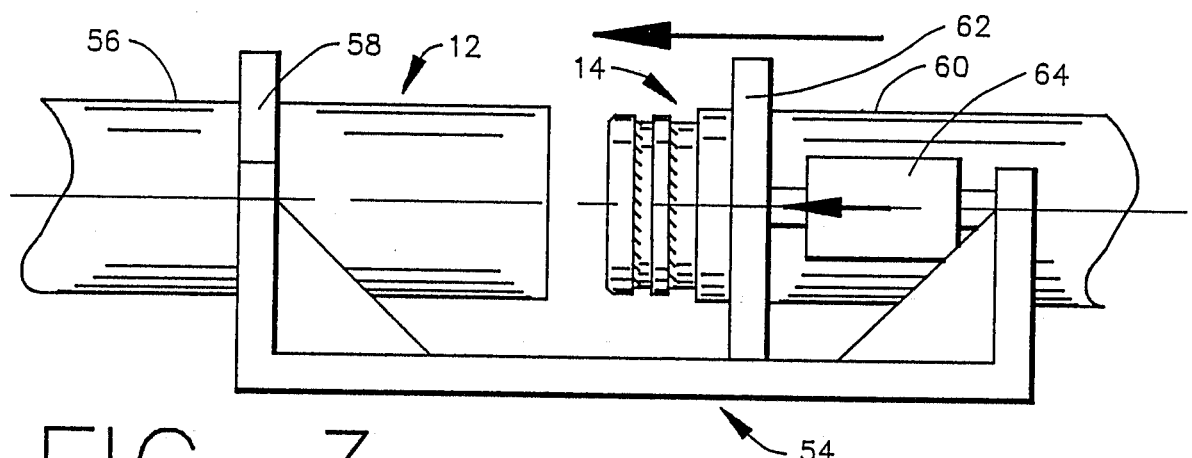
FIG. 3 is a schematic view on reduced scale showing a clamp and ram for forcing ends of pipe together.

The plastic pipe having the integral end connection is generally illustrated by the reference numeral 10 in FIGS. 1-3. Each length of pipe is provided with a female connection 12 and a male connection 14, although it will be understood that where desired the alternate pipes may have both ends with male or female connections and that the pipes may be fitted together in this fashion.

The plastic pipe is preferably polyethylene but other polyolefin pipes such as polypropylene and polybutylene having similar characteristics of semi-rigid and ability to bend slightly along substantial lengths and having the capacity to distend or contract slightly may be employed. The pipes may range in diameter from about three inches to over five feet and have a substantial wall thickness to withstand internal and external pressures and resistance to abrasion when the pipes are moved along the ground in various types of construction.

The integral female and male end connectors are formed on the interior and exterior surface in the fabrication of the pipe itself as in the molding process or by machining. Each of the end connections has one or more ribs and grooves which interfit with one another when the female and male end connections are press-fitted together as will be more fully described hereinbelow. When fitted and locked together the joined pipes present a flush continuous internal and external surface which reduces internal friction or resistance to fluid flow on the interior and provides a smooth external surface presenting no impediment or drag when moved along the ground or through a pipe as in a slip-lining operation.

The female end connector 12 with more than one groove is comprised of an end or outer rib 16 and an inner rib 18. A first or outer groove 20 separates the two ribs while a second or interior groove 22 separates the inner rib 18 from a stop shoulder 24 as best shown in FIGS. 1 and 2. In order to facilitate the joining or riding together of the female and male end connections the end rib 16, a bevelled or chamfered surface 26 is formed at the outer corner of the rib.

The male end connection 14 has ribs and grooves formed in a similar fashion to that of the female end connection 12 but on the exterior of the pipe. Thus, a male end with more than one groove has an end or outer rib 28 formed on the pipe along with a second or inner rib 30. A first or outer groove 32 separates the two ribs while a second or inner groove 33 separates the inner rib 30 from a stop shoulder 34. A bevelled or chamfered surface 36 is formed at the outer corner of the male end connection which facilitates the joining together of the end connection and distends or expands the female end connection and compresses the male connection by the wedging or camming action when the bevelled surface 26 and 36 of the female and male end connections are pressed together.

In order to ensure that the ribs and grooves of the female and male end connections with more than one groove do not prematurely engage until the full joined connection is made, as shown in FIG. 2 the end or outer ribs 16 and 28 of the female and male end connections, respectively, are constructed to be wider than the end grooves 20 and 32 of the female and male end connections. This prevents engagement of the ribs in these grooves. Proper engagement of the aforementioned end ribs 16 and 28 occurs when the female and male end connections are completely pushed together at which time engagement of the afore-mentioned ribs 16 and 28 occurs in the grooves 33 and 22, respectively, as will be seen in FIG. 2. Similar engagement of the inner ribs 18 and 30 of the female and male end connections, of somewhat lesser width than the end ribs, will take place in the outer grooves 32 and 20 of the male and female end connections, respectively. It will be understood that a slight tolerance is provided for the interfit of the ribs in the mated relation in the grooves as will be well understood in the art.

When desirable to ensure that should there be any failure in the end connections when encountering the considerable force applied in pulling or pushing the joined pipe the thickness of the wall cut under the grooves may be less than the width of the narrowest rib to ensure that breakage is at the readily observable exterior of the pipe wall rather than at an obscured rib. Thus, the wall 38 between the bottom of the grooves 20 and 22 and the exterior 40 of the pipe for the female end connection is constructed to be less than the width of the narrowest rib, i.e. rib 18. In the construction of the ribs and grooves as an example, the thickness of the wall 38 between the exterior surface 40 and the interior surface 42 may be about one-third the total wall thickness while both the ribs 16 and 18 may be about two-thirds the total wall thickness.

The male end connection 14 is constructed in a similar fashion. Thus, the thickness of the wall 44 between the bottom of the grooves 32 and 33 and the interior wall 46 is less than the width of the narrowest rib 30 to ensure wall breakage rather than rib breakage in the event of failure. In like manner the thickness of the wall 44 may be about one-third the total thickness of the wall of the end connection between the interior surface 46 and the exterior surface 48.

As an actual example, the female and male end connections may be formed in length of 20 to 40 feet of polyethylene pipe having an outside diameter of 6.63 inches and an internal diameter of 6.19 inches and a modulus of elasticity of 100,000 psi to 140,000 psi at room temperature. In the press-fitting together of the female and male end connections an axial force or 900 pounds to 1,100 pounds may be applied. Deformation or distending of the female end connector and compression of the male end to accommodate the interfit of the male member as the respective ribs over one another until registering engagement is effected is about 2%, well under an upper limit of about 5% which can be safely encountered before a permanent distortion.

When the pipe is to be joined together a gasket compound or sealant such as that shown at 50 and 51 may be employed. This may be in the form of any conventional sealant such as a flexible butyl rubber sealant of the like. Also where extremely high internal pressures are encountered rather than conventional lower hydrostatic pressures, an external clamp (not shown) bridging the end connections at the seam 52 of the joined end connections shown in FIG. 2 may be utilized.

Where it is desirable to separate the connection for reuse of the individual pipe lengths the number, length and depth of grooves and ribs can be modified and bevels added on the inner or trailing sides of all the ribs to facilitate disengagement when the pipes are pulled apart and to prevent damage to the pipe or connections when separating. The wall thickness between the bottom of the grooves and the pipe wall may be increased from about one-third to about one-half the pipe wall thickness and the rib thickness may be also changed.

Figure 4:
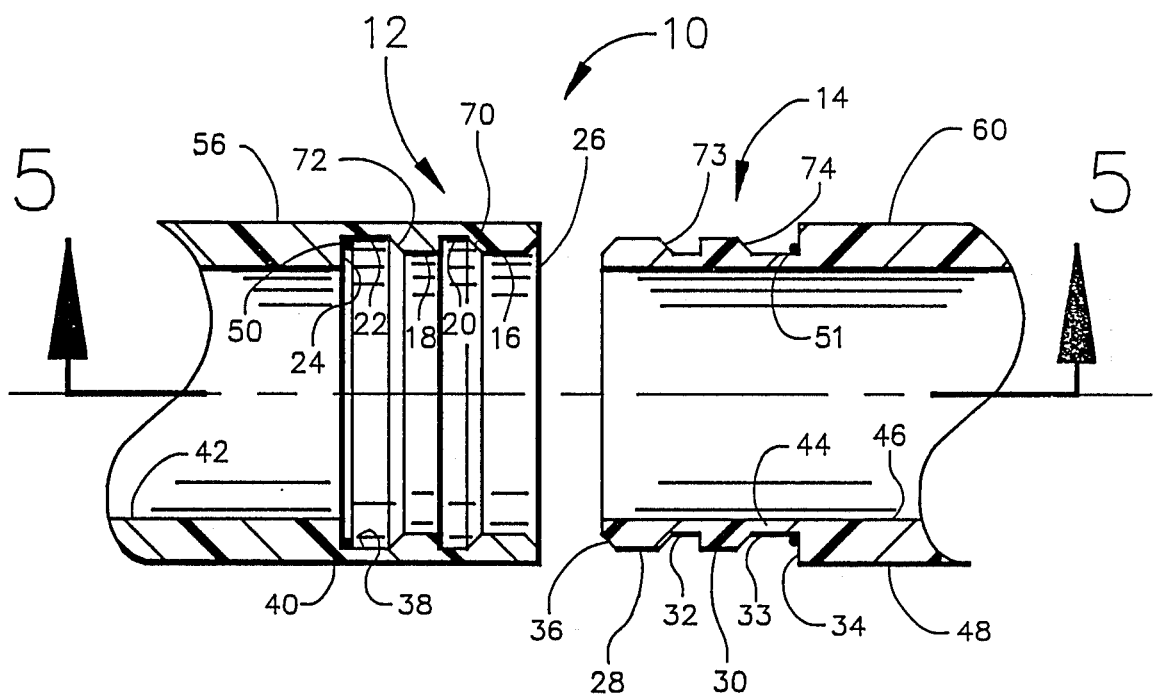
FIG. 4 is a view in axial section of a modified pipe having bevelled ribs permitting disengagement.
Figure 5:
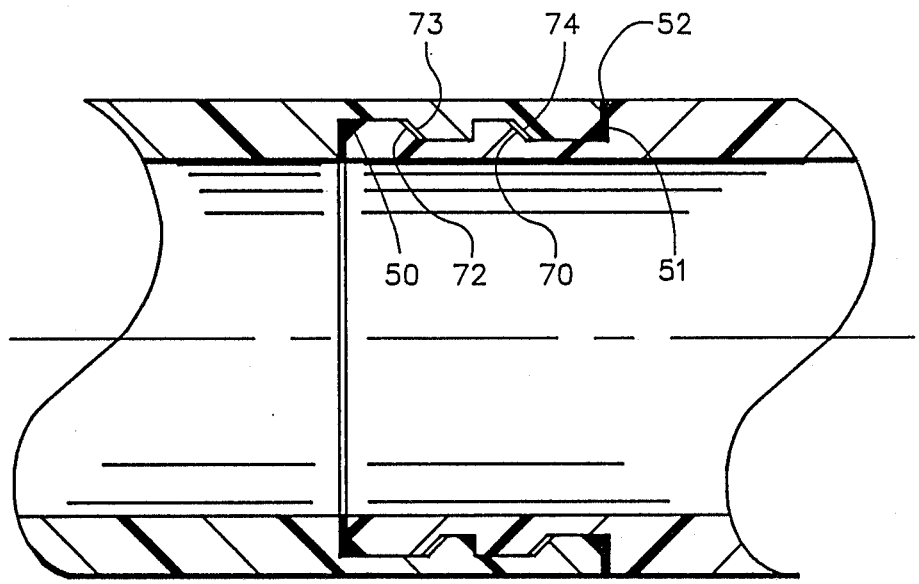
FIG. 5 is an enlarged view in axial section of the modification of FIG. 4 showing the joined ends of the pipe.

A modification of the pipe end connections is shown in FIGS. 4 and 5 providing for disengagement of the female and male pipe ends when the joined pipes are pulled apart. In this modifcation the corners of the mating ribs and grooves are bevelled to provide a camming action to expand the female member 12 and the male member 14 when the pipes are pulled apart in a reverse direction of the arrow shown in FIG. 3. In order to provide this feature the ribs 16 and 18 of the female member each have inner bevelled sides designated by reference numerals 70 and 72, respectively, which also form outer sides of the adjacent grooves 20 and 22.

Likewise, the male end connection has ribs 28 and 30 bevelled at the inner sides 73 and 74, respectively, which form the outer sides of the adjacent grooves 32 and 33, respectively.

When the female and male end members are joined in the relation shown in FIG. 5 the bevelled edges of the ribs act to wedge or force the female member to an expanded position and the male member to a contracted position to facilitate the disengagement.

METHOD OF USE

The pipe of this invention with the integral end connections is simply and easily connected together. This is of particular advantage in the field where labor and equipment may be difficultly accessible.

One method of joining the separate lengths together comprising a clamp and press device generally indicated by the reference numeral 54 may be employed. One pipe length 56 having a female end connection 12 may be clamped by the clamp 58 while another pipe length 60 having a male end connection 14 is clamped in a moveable press clamp 62 powered by a hydraulic piston 64 or the like moveable in the direction of the arrow. The pipe length 60 is moved toward the pipe length to insert the male end connection into the female end connection until the complete locking interfit shown in FIG. 2 is obtained. A reverse arrangement of the pipe lengths in the clamped press device may be employed as will be readily understood.

Other means for joining may be employed which, per se, form no part of this invention. In the field heavy construction equipment such as bulldozers, back hoes and the like may be used to push one length of pipe into another pipe which may be anchored or fixed against movement in one fashion or another.

The pipe lengths may be joined in a string of pipe lengths and pulled or pushed to any desired final location. The locked joint when sealed with the flexible butyl rubber sealant assures a water tight joint preventing both infiltration and exfiltration. This is particularly beneficial where the corrosion, abrasion resistance and the flexibility of polyolefin pipe is needed.

The outside and inside surfaces are flush and of constant diameter which enhances fluid flow and obviates external fittings and protruberances which would cause problems in pulling the pipe along the ground or in the interior of a larger pipe to be repaired as in the case of slip-lining. Further, no reduction in pipe size is required as where external clamps are employed.

In order to ensure that there is no failure in the end connections or in the pipe wall if it is desired to be able to disengage the coupling the depth of grooves, the number of grooves and the bevelled surfaces can be modified as shown in FIGS. 4 and 5 to allow separation with a pulling force low enough to prevent material failure. The lengths can be separated by following in reverse order the procedure for joining.

While the end connections have been disclosed for both the female and male end connections as being formed integrally in plastic pipe for use with each other, it will be understood that in some cases there may be a connection to a rigid steel pipe or the like as at the terminal or start of a line or the like.

Various changes and modifications may be made within this invention as will be apparent to those skilled in the art. Such changes and modifications are within the scope and teaching of this invention as defined in the claims appended hereto.

What is claimed is:

1. Polyolefin pipe having an integral end connection comprising a pair of female and male integral end connections for adjacent lengths of pipe adapted to be press-fitted together to form a locked end connection having a flush exterior and interior surface with said adjacent lengths of pipe, said female end connection comprising a plurality of interior circumferentially extending discrete, circular radial ribs and a plurality of interior circumferentially extending discrete, circular radial grooves bordering said ribs, said male end connection comprising a plurality of corresponding exterior circumferentially extending discrete, circular radial ribs and a plurality of exterior circumferentially extending discrete, circular radial grooves bordering said last named ribs, said male and female end connections being adapted to be axially press-fitted together to distend said female end connection and compress said male end connection until a mating relation of the ribs and grooves in said end connection is obtained, said ribs in each of the male and female end connections decreasing in width inwardly from an end of each of said pipes to mate with the plurality of grooves in each of the male and female end connections correspondingly increasing in width inwardly from said ends of said pipes to provide for proper registry to prevent premature rib and groove engagement until a locking registration is obtained, the ribs of the female end connection having walls extending axially and of substantially the same diameter, the grooves of the female end connection having walls extending axially and of substantially the same diameter, the ribs of the male end connection having walls extending axially and of substantially the same diameter and the grooves of the male end connection extending axially and of substantially the same diameter in order that end-most ribs can ride over grooves in the end connections without being seated until a proper locking registraiton is obtained.

2. The polyolefin pipe of claim 1 in which the female end connection is distended and the male end is compressed up to about five percent in diameter as the male end connection is inserted in the female end connection as the ribs of the male connection contact the ribs of the female connection and distend said female end connection and compress the male end connection.

3. The polyolefin pipe of claim 1 in which said ribs and grooves have a substantially rectangular configuration to provide a flush seating and secure locking engagement.

4. The polyolefin pipe of claim 1 in which only an end-most rib of each of the female and male connections have mating bevelled surfaces which provide a wedging action to distend the female end connection and compress the male end connection as the male end connection is press-fitted within the female end connection.

5. The polyolefin pipe of claim 1 in which the ribs of each of the female and male end connections have mating bevelled surfaces on an inner trailing side which provide a wedging action to distend the female end connection and compress the male end connection as the end connections are pulled apart and separated.

6. The polyolefin pipe of claim 1 in which the ribs and grooves are formed integrally within the interior of the female end connection leaving an exterior surface of the pipe end undisturbed and the ribs and grooves of the male end connection are formed integrally within the exterior of the male end connection leaving an interior surface of the pipe end undisturbed and said female and male end connections when being press-fitted together presenting a flush interior and exterior surface with said pipe lengths and a butted together single circumferential seam.

7. The polyolefin pipe of claim 1 in which said ribs in each of the female and male end connections all have a greater axial width than the pipe wall thickness at the bottom of the grooves in each of the connection to provide a preferential rupture of the pipe wall rather than the ribs in the event of failure of the female and male end connections when connected together.

8. The polyolefin pipe of claim 1 in which an outer end of the male end connection is received in an inner-most groove of the female end connection in slightly spaced relation from a stop shoulder forming part of said groove to accommodate an internal sealing member therein and an outer end of the female end connection is received in an inner-most groove of the male end connection in slightly spaced relation from a stop shoulder forming part of said groove to accommodate an external sealing member therein.

9. The polyolefin pipe of claim 1 in which said ribs and grooves have a rectangular configuration to provide a flush seating and secure locking engagement and an end-most rib of each of the female and male end connections have mating bevelled surfaces which provide a wedging action to distend the female end onnection and compress the male end connection as the male end connection is press-fitted within the female end connection.

10. The polyolefin pipe of claim 9 in which the female end connection is distended and the male end connection is compressed up to about five percent in diameter as the male end connection is inserted in the female end connection as the ribs of the male connection contact the ribs of the female connection and distend said female end connection and compress said male end connection.

11. The polyolefin pipe of claim 9 in which the ribs and grooves are formed integrally within the interior of the female end connection leaving an exterior surface of the pipe end undisturbed and the ribs and grooves of the male end connection are formed integrally within the exterior of the male end connection leaving an interior surface of the pipe end undisturbed and said female and male end connections when being press-fitted together presenting a flush interior and exterior surface with said pipe lengths and a butted together single circumferential seam.

12. The polyolefin pipe of claim 1 in which said ribs and grooves have a rectangular configuration to provide a flush seating and securing locking engagement, an end-most rib of each of the female and male end connections have mating bevelled surfaces which provide a wedging action to distend the female end connection and compress the male end connection as the male end connection is press-fitted within the female end connection, the ribs and grooves are formed integrally within the interior of the female end connection leaving an exterior surface of the pipe end undisturbed and the ribs and grooves of the male end connection are formed integrally within the exterior of the male end connection leaving an interior surface of the pipe end undisturbed and said female and male end connections when being press-fitted together presenting a flush interior and exterior surface with said pipe lengths and a butted together single circumferential seam and said ribs in each of the female and male end connections all have a greater axial width than the pipe wall thickness at the bottom of the grooves in each of the connection to provide a preferential rupture of the pipe wall rather than the ribs in the event of failure of the female and male end connections when connected together.

13. The polyolefin pipe of claim 12 in which an outer end of the male end connection is received in an inner-most groove of the female end connection in slightly spaced relation from a stop shoulder forming part of said groove to accommodate an internal sealing member therein and an outer end of the female end connection is received in an inner-most groove of the male end connection in slightly spaced relation from a stop shoulder forming part of said groove to accommodate an external sealing member therein.

14. The polyolefin pipe of claim 7 in which the pipe wall thickness at the bottom of the grooves for each of the female and male end connections is about one-third of the total wall thickness of the pipe and the thickness of the ribs for each of the female and male end connections is about two-thirds of the total wall thickness of the pipe.

15. The polyolefin pipe of claim 11 in which the pipe wall thickness at the bottom of the grooves for each of the female and male end connections is about one-third of the total thickness of the ribs for each of the female and male end connections is about two-thirds of the total wall thickness of the pipe and an outer end of the male end connection is received in an inner-most groove of the female end connector in slightly spaced relation from a stop shoulder forming part of said groove to accommodate an internal sealing member therein and another end of the female end connection is received in an inner-most groove of the male end connection in slightly spaced relation from a stop shoulder forming part of said groove to accommodate an external sealing member therein.

16. The polyolefin pipe of claim 5 in which the pipe wall thickness at the bottom of the grooves for each of the female and male end connections is more than one-third of the total wall thickness of the pipe and the thickness of the ribs for each of the female and male end connections is more than one-half of the total wall thickness to provide a reduced amount of distension of the female end connection and compression of the male end connection as the connections are mated together or pulled apart.

* * * * *